Sept. 30, 1941.  W. W. MASON  2,257,345
HATCH
Filed Dec. 30, 1939   3 Sheets-Sheet 1

INVENTOR
Walden W. Mason.
BY
Arthur C. Brown
ATTORNEY

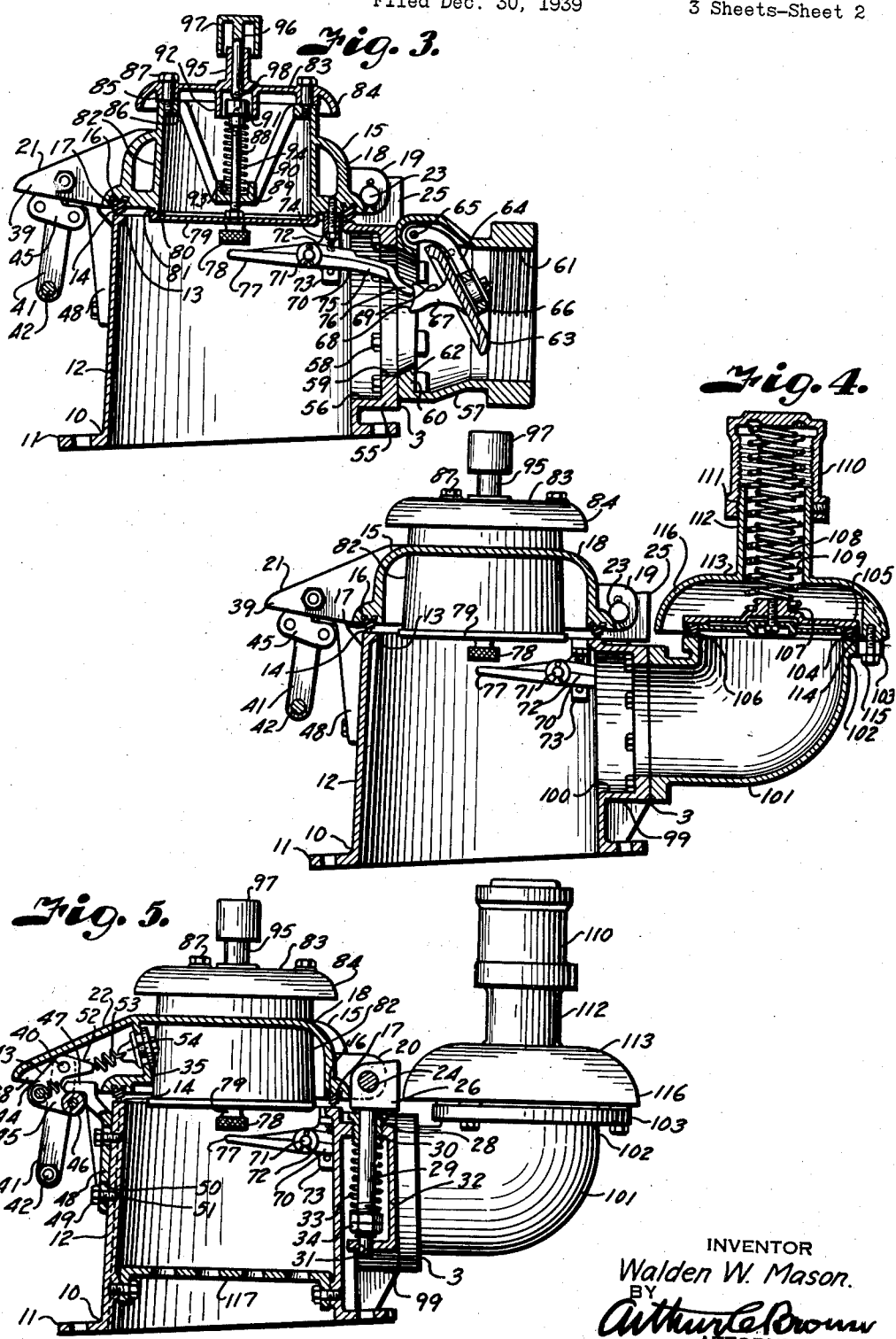

Sept. 30, 1941. W. W. MASON 2,257,345
HATCH
Filed Dec. 30, 1939 3 Sheets-Sheet 3
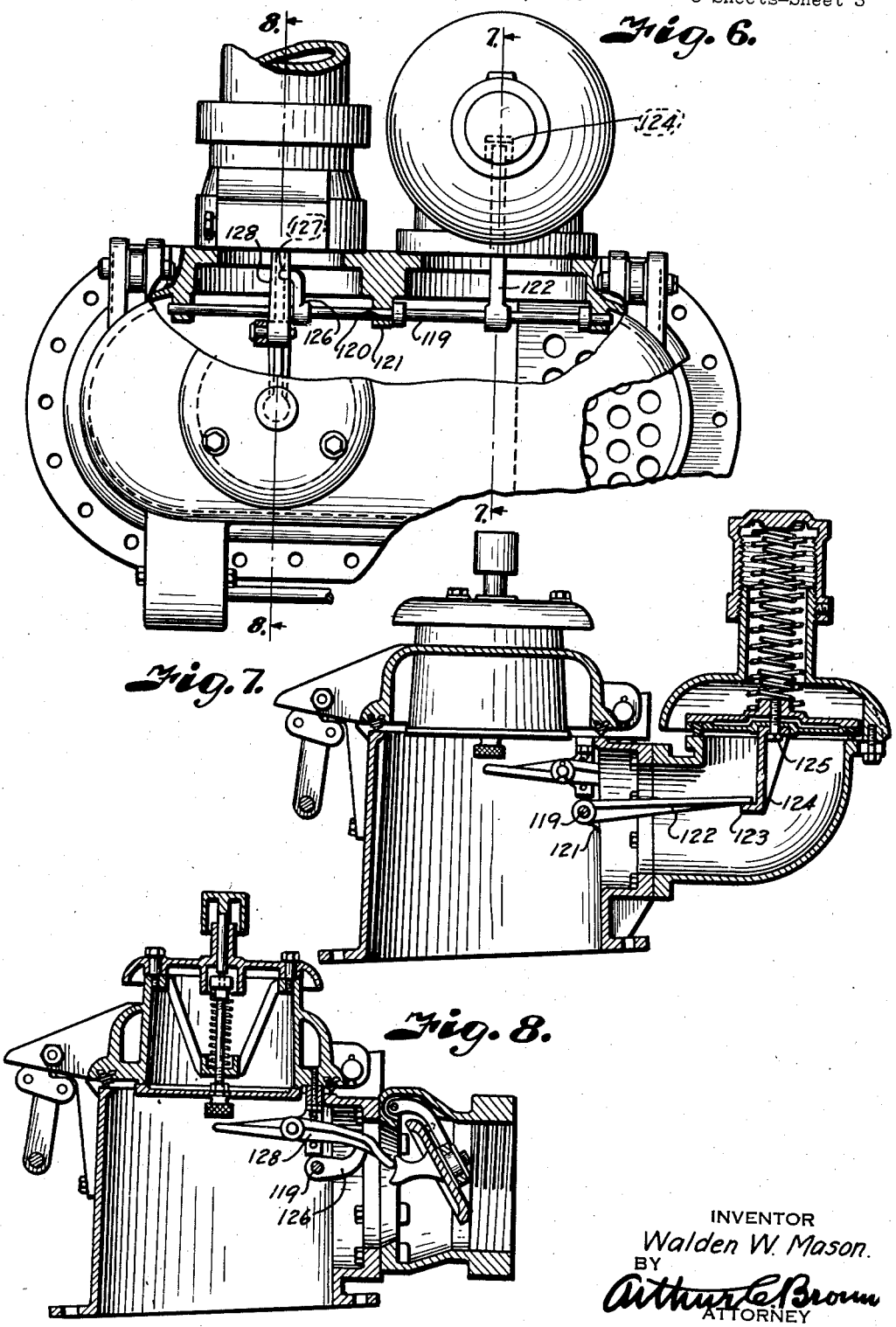
INVENTOR
Walden W. Mason.
BY
Arthur E. Brown
ATTORNEY Patented Sept. 30, 1941

2,257,345

UNITED STATES PATENT OFFICE 2,257,345

HATCH

Walden W. Mason, Kansas City, Mo.

Application December 30, 1939, Serial No. 311,709

10 Claims. (Cl. 220—85)

This invention relates to hatches particularly for tanks containing volatile fluids. Tanks of this character are usually arranged in batteries and inter-connected by pressure equalizing lines so that under normal conditions pressure differentials occurring in one tank are equalized with pressures in the other tanks, thereby conserving the vapors and preventing their escape when an excess pressure or vacuum tends to occur in one of the tanks. The tanks are also equipped with pressure and vacuum relief valves arranged to operate respectively at maximum and minimum predetermined pressures. The tanks are further provided with hatches wherethrough the tanks are gauged and samples of liquid are taken. The connections for all of these fittings involve considerable complications and especially when it is desired to close check valves in the equalizing lines when excess pressure or vacuum differentials occur in one or more of the tanks, or when the hatch of one of the tanks is to be opened for gauging and sampling purposes.

It is, therefore, a principal object of the present invention to provide a simplified installation wherein the pressure and vacuum control valve for each tank together with the check valve of the connected equalizing line are arranged as a unit with the hatch, thereby simplifying the trigger mechanisms necessary to actuate the check valve when the vacuum and pressure relief valves function or the hatch is opened.

It is a further object of the invention to provide means included with the hatch assembly to close the check valve selectively and to equalize pressure in the tank with atmosphere prior to opening of the hatch cover.

A further object of the invention is to provide for pressure relief and closure of the check valve entirely independently of operation of the hatch cover.

In accomplishing these and other objects of the invention, as hereinafter pointed out, I have provided improved details of structure, the preferred forms of which are illustrated in the accompanying drawings, wherein:

Fig. 3 is a cross-section through the hatch on the line 3—3 of Fig. 2, particularly illustrating the check valve controlling flow through the equalizing connection with the other tanks of the battery and the trip mechanism normally holding the check in open position.

Fig. 4 is a cross-section on the line 4—4 of Fig. 2, particularly illustrating the pressure relief valve and its mounting on the hatch collar.

Fig. 5 is a similar section on the line 5—5 of Fig. 2, particularly illustrating the latch for retaining the cover in closed position and the spring mounting of the hatch cover hinges.

Fig. 6 is a plan view partly in section of a modified form of hatch assembly wherein the check is tripped responsive to operation of the pressure relief valve, as well as by manual or automatic operation of the vacuum relief valve.

Fig. 7 is a vertical cross-section through the modified form of the invention taken on the line 7—7 of Fig. 6.

Fig. 8 is a similar section on the line 8—8 of Fig. 6.

Figure 1:
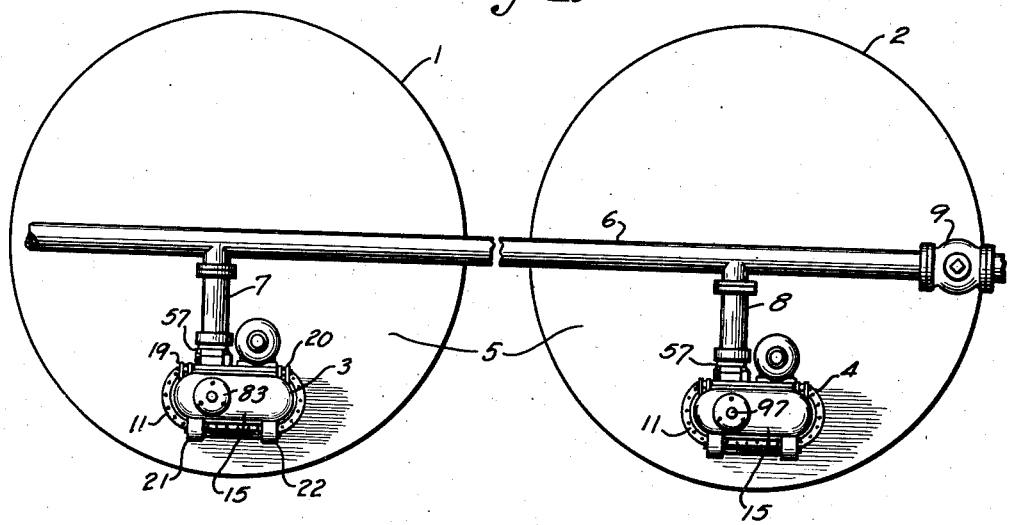
Fig. 1 is a plan view of two tanks in a battery equipped with hatch assemblies embodying the features of the present invention.

Referring more in detail to the drawings:

1 and 2 designate tanks or other vessels for containing volatile liquids such as oil and similar hydrocarbons under slight pressure differential to prevent breaking out of lighter volatile fractions. The tanks 1 and 2 are provided with hatches 3 and 4 that are mounted on roofs 5 thereof and through which contents of the tanks are gauged or sampled as in conventional practice. The tanks are connected by a common equalizing header 6, having lateral branches 7 and 8 which communicate with the respective tanks by way of the hatches 3 and 4. One end of the equalizing header is closed but the other end is provided with a back pressure control valve 9 that may be set to maintain a predetermined equalized pressure differential in all of the respective tanks, the pressure being generated by reason of the volatile characteristics of the contained fluid.

The hatches 3 and 4 are of identical construction and therefore only one of them need be described in detail. Each hatch includes an elongated collar-like body 10 having a base flange 11 for attachment over an opening in the roof 5 by welding or by insertion of fastening devices. The upper edge of the collar wall 12 terminates in an annular, inwardly extending rim 13 forming a seat 14 for a hatch cover 15. The cover 15 conforms in shape to the seat 14 but is of slightly larger dimensions to accommodate a groove 16 containing a resilient gasket ring 17 which sealingly engages the seat 14 and prevents leakage under the hatch cover.

The cover has a dome-like top 18 having laterally extending pairs of ears 19 and 20 at one side and forwardly projecting canopy-like arms 21 and 22 on the other. Engaged between the ears of the respective pairs and hinged thereto by pintles 23 and 24 are heads 25 and 26 of brackets 27 and 28. The brackets 27 and 28 are yieldably mounted on the hatch collar and each includes a stem 29 slidably mounted in a threaded bushing 30 and a bearing opening 31 at the respective ends of a spring housing 32 formed as an integral part of the rear wall of the hatch collar as shown in Fig. 5. Sleeved on the respective stems and having one end engaging the bushing 30 are coil springs 33 adjustably tensioned by jam-nuts 34 whereby yielding pressure is exerted on the cover to retain the gasket in seated position.

The arms 21 and 22 at the opposite side of the cover include inset web portions 35 and depending sides 38 and 39. Extending between the sides 38 and 39 in outwardly spaced relation with the webs 35 are bolts 40 pivotally supporting depending arms 41 which are inter-connected by a handle bar 42. Fixed to the upper ends of the arms are latch members 43 in the form of bellcranks, the arms 44 of which pivot with the arms 41 about the axes of the bolts 40, and the other arms 45 carry rollers 46 engageable under keepers 47 formed as a part of brackets 48 adjustably mounted on the front wall of the hatch collar by fastening devices 49 which project through slotted openings 50 in the brackets and into threaded sockets 51 of the collar. The bell-cranks also include stops 52 formed as a part of the arms 44 and adapted to engage the keepers when the rollers 46 are moved out of latching engagement therewith.

In order to urge the rollers in latching engagement with the keeper, the bell-cranks of each latch mechanism are connected by a spring 53 with a lug 54 carried by the webs 35. Therefore when the cover is opened and moved to closed position the rollers 46 ride over the keepers and are drawn into latching engagement therewith by the springs 53. While the cover is yieldingly supported on the hatch collar the springs are sufficiently tensioned to retain the cover tightly on its seat under any working pressures occurring within the tank, the yieldable mounting being for the purpose of equalizing pressure on the gasket.

In carrying out the present invention, I have provided for mounting of a vacuum relief valve, a pressure relief valve, and a check valve, on each hatch so that they form unitary parts of the hatches and are adapted to be mounted therewith as unit assemblies, thereby simplifying the construction and operation of the various valves and trip mechanisms therefor, as now to be described.

Formed on the hatch collar, preferably on the rear wall adjacent one end thereof, is a lateral extension 55 providing an outlet opening 56 to a check valve housing 57 which is secured to the lateral extension by fastening devices such as bolts 58 projecting through inturned flanges 59 and 60 on the lateral extension and valve housing respectively. The opposite end of the valve housing is provided with internal threads 61 to receive the respective branches 7 and 8 that are connected with the equalizing header. The inturned flange 60 forms a valve seat 62 on the outlet side with respect to the hatch to seat a check valve 63. The check valve 63 is carried on a swing arm 64 pivoted on a cross-pin 65 within the check valve housing. The check valve is flexibly mounted within a collar 66 at the terminal end of the swing arm so that it is adapted for self-alignment with its seat when the valve is swung to closed position.

Projecting from the inner face of the check valve and extending through the opening 56 is an arm 67 having a trip lever engaging seat 68 and an upper recess 69 to receive the trip lever when the check is closed. The trip lever 70 is pivotally mounted on a cross-pin 71 that is carried between a pair of ears 72 on a bracket 73, the bracket 73 being fixed to the under side of the hatch cover by a fastening device 74, as shown in Fig. 3. The trip lever 70 includes a forwardly extending arm 75 which terminates in a downwardly curved latch finger 76 engaging in the seat 68. Also fixed with the arm and projecting inwardly of the hatch collar is an arm 77 which is adapted to be engaged by a button 78 carried on a vacuum relief valve 79. The vacuum relief valve includes a disk-like body having a peripheral face 80 normally engaging an annular seat 81 formed about a collar 82 that is carried in and which forms a part of the hatch cover. The collar 82 continues through the top of the cover and supports a cap 83 having a downturned eave portion 84 arranged circumferentially of the terminal end of the collar, the cap being spaced from the sleeve by bosses 85 engaging an inturned flange 86 on the collar and which are secured by fastening devices 87.

The valve 79 includes a stem 88 slidably supported at its lower end in a bearing 89 carried by a bracket 90 depending from the terminal edges of the inturned flange of the collar. The upper end carries a head 91 slidable in a socket 92 formed in the cap as shown in Fig. 3. Sleeved over the stem and having one end bearing in a socket 93 of the bracket and its opposite end against the head 91 is a coil spring 94 tensioned sufficiently to hold the relief valve 79 in seated position until such a time that pressure in the tank drops below the point where it is hazardous to the tank, in which case external air pressure acting on the valve opens the valve to relieve vacuum in the tank and prevent collapse thereof. Usually this further drop of pressure in the tank is brought about through too rapid emptying of the contents thereof. To prevent drawing of vapors from the other tanks connected in the battery, opening of the vacuum valve is caused to actuate the trip lever to effect unseating of the finger 76 from latching engagement with the seat 68, thereby permitting the check valve to close. As long as tendency for the vacuum continues, air is being drawn into the tank to prevent collapse thereof.

The vacuum valve also performs another important function, that is in relieving pressure in the tank and effecting closure of the check valve prior to opening of the hatch cover when the contents of the tank is to be gauged or a sample is to be taken. This is effected by providing the cap 83 with a sleeve-like boss 95 and in which is slidably mounted a plunger 96 engageable with the head 91 of the vacuum valve stem. The plunger projects sufficiently above the sleeve-like guide to mount an actuating button 97. The plunger is retained in position by a cotter pin 98 extending through an opening in the end thereof which engages the head 91. It is thus obvious that prior to opening of the hatch cover, the button of the plunger may be depressed to effect opening of the vacuum valve, thereby allowing pressure in the tank to vent to atmosphere. This movement of the vacuum valve effects actuation of the trip lever to release the check valve, thereby allowing it to swing to closed position so as to avoid drawing vapor from the other tanks of the battery.

Due to the fact that volatile liquid is contained in the tank there may be times when the vapor pressures may become excessive and it is necessary to relieve the pressures. This is effected by providing the opposite end of the rear wall of the hatch collar with a lateral extension 99 forming an outlet opening 100 for the release of pressure. Fixed to the lateral extension is an L-fitting 101 arranged with the outlet branch 102 thereof in a vertical position as shown in Fig. 4. This branch is provided with an annular flange 103 forming a seat 104 for a pressure relief valve 105 of disk-like form and provided with a gasket 106 to engage the seat 104. The center of the valve carries a boss 107 for seating coaxial springs 108 and 109. The springs are normally tensioned against the valve by an adjustable cap 110 seating the opposite ends of the springs and which is threadedly supported, as at 111, on a threaded neck 112 on a cap 113. The cap 113 is supported in spaced relation with the seat 104 by lugs 114 fixed to extensions of the seat flange by fastening devices 115. The cap 113 includes an eave 116 extending in protecting relation over the valve, but which is spaced sufficiently therefrom to allow freedom of valve movement when the valve is unseated responsive to excessive pressures occurring in the tank.

While I have illustrated springs for retaining the valve in seated position, it is obvious that suitable weights may be substituted therefor without departing from the spirit of the invention.

The end of the hatch collar adjacent the pressure relief opening may be provided with a screen-like shelf 117 to seat the end of the gauge rod or form a support for the sampler (not shown).

The form of the invention illustrated in Figs. 6 and 8 is similar to that just described with the exception that means is provided for automatically closing the check upon actuation of the pressure relief valve. This is effected by means of a rock-shaft 119 mounted in bearing openings 120 formed in lugs 121 extending inwardly of the hatch collar as clearly shown in Fig. 6. Fixed on the shaft in alignment with the pressure relief valve is a rocker arm 122 which engages an inwardly extending finger 123 on a bracket 124 carried by the pressure relief valve, the valve being secured in position by fastening devices 125. Also fixed on the rock-shaft is a trip actuating arm 126, having a laterally turned finger 127 extending under the trip lever 128 similarly to the trip lever previously described.

It is thus obvious that when the pressure release valve is unseated the finger 123 on the bracket 124 lifts the rocker arm 122 to rock the shaft 119 and cause the arm 126 to raise the trip lever from latching engagement with the check valve so that the check valve swings to closed position and thereby prevents vapor from being drawn from the other tanks of the battery.

Figure 2:
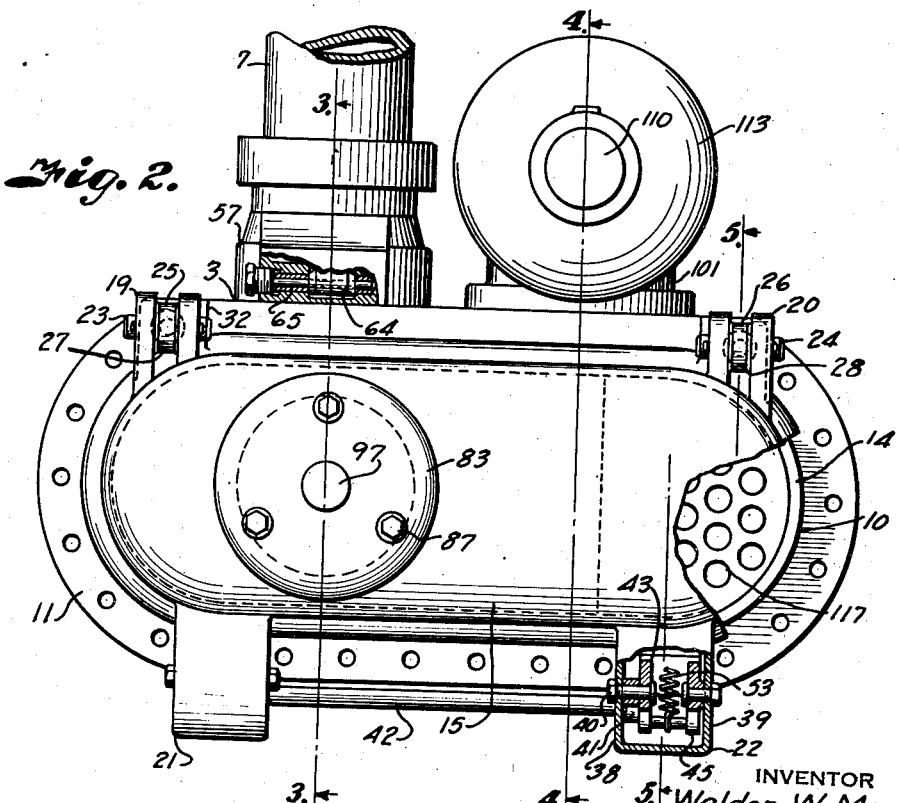
Fig. 2 is an enlarged plan view of one of the hatch assemblies, parts of which are broken away to better illustrate the construction thereof.

Assuming that a hatch assembly as illustrated in Figs. 1 to 5 inclusive is installed on a tank and that excessive pressure is occurring therein, the pressure acts through the hatch and port 100 against the under face of the valve 105. When the pressure preponderates over the tension of the springs 108 and 109, the springs yield to release excess pressure. In case a vacuum should occur in the tank, as when liquid is drawn therefrom or sudden condensation of the vapor contained therein, the vacuum relief valve 79 functions to allow admission of atmospheric air into the tank. This movement of the vacuum valve effects actuation of the trip lever to seat the check valve 63, thereby isolating the tank being drained from the other tanks in the battery. When the check has been tripped from either of these causes, it will retain its seat, but when the temperature increases and pressure again accumulates in the tank so that it reaches a point slightly higher than the pressure in the equalizing line, the check will swing open to allow pressure equalization. The check is also free to swing open when the tank is being filled with liquid so that the pressure being produced incidental to introduction of the liquid will open the check and vapors in the displaced air will pass through the equalizing line to the other tanks. Due to arrangement of the trip lever, the check will be reset upon opening thereof through either of these causes without moving the cover of the hatch.

When it is desired to gauge the tank, the pressure in the tank is first released and the check valve closed by applying pressure on the button 97 to unseat the valve 79. When the pressure is relieved, the cover is unlatched and opened so that the gauging or sampling operations may be performed. Upon closure of the hatch cover the check is automatically returned to open position since the finger on the trip lever is in line to engage the seat 68.

From the foregoing it is obvious that I have provided a hatch assembly which carries the pressure control accessories of a tank so that they may be installed as a unit and may operate freely since the trip mechanisms are adapted to be adjusted at the factory. Therefore separate mounting of the various valves is not required at the time of erecting the tank.

What I claim and desire to secure by Letters Patent is:

1. A hatch including a collar-like body having separate pressure equalizing and relief ports, valves controlling said ports, a cover having a vacuum relief port, a vacuum responsive valve normally closing the vacuum relief port in said cover, trip means normally retaining the valve controlling the equalizing port in open position, means actuated responsive to opening of said vacuum responsive valve for actuating said trip means, and means removably securing the cover on said body.

2. A hatch including a collar-like body having separate pressure equalizing and relief ports arranged in spaced relation in a wall of said body, a cover on said body and having a vacuum relief port, valves controlling flow through said ports, trip means normally retaining the valve controlling the equalizing port in open position, and means actuated responsive to opening of the valves controlling said relief ports for actuating the trip means, said actuated means being independently operable by the respective valves controlling the relief ports.

3. A hatch having separate pressure relief, vacuum, and equalizing valves, latch means normally retaining the equalizing valve in open position, and means for tripping said latch means responsive to opening of the vacuum valve independently of the pressure relief valve.

4. A hatch including a collar-like body, pressure relief, vacuum, and equalizing valves connected with said hatch, a cover for said body, latch means normally retaining the equalizing valve in open position, means for tripping said latch means responsive to opening of the vacuum valve, and manual means for opening the vacuum valve whereby the equalizing valve is closed and pressure is relieved through the vacuum valve independently of the pressure relief valve and prior to opening of the cover.

5. A hatch including an elongated collar-like body having pressure equalizing and relief ports at the respective ends thereof, valves controlling said ports, a cover having a relief port, a valve closing the relief port in said cover, trip means normally retaining the valve controlling the equalizing port in open position, means actuated responsive to opening of said valve controlling the relief port in the cover for actuating said trip means, and means removably securing the cover on said body.

6. A hatch including a collar-like body having pressure equalizing and relief ports, valves controlling said ports, a cover having a relief port, a valve closing the relief port in said cover, trip means normally retaining the valve controlling the equalizing port in open position, means actuated responsive to opening of said valve controlling the relief port in the cover for actuating said trip means, means removably securing the cover on said body, and means responsive to actuation of the valve controlling the pressure relief port in said body for actuating the trip means independently of the valve controlling the relief port in the cover.

7. A hatch including a collar-like body having pressure equalizing and pressure relief ports, valves controlling flow through said ports, a rock-shaft supported by said body, rocker arms on said shaft, means connecting one of the rocker arms with the valve controlling the pressure relief port to rock said shaft upon opening of said valve, and means actuated by the other rocker arm for closing the valve controlling flow through the equalizing port.

8. A hatch including a collar-like body having pressure equalizing and pressure relief ports, valves controlling flow through said ports, a rock-shaft supported by said body, rocker arms on said shaft, means connecting one of the rocker arms with the valve controlling the pressure relief port to rock said shaft upon opening of said valve, means actuated by the other rocker arm for closing the valve controlling flow through the equalizing port, a cover for said collar-like body, and means carried by the cover for closing said valve controlling the equalizing port independently of said valve controlling the pressure relief port.

9. A hatch including a collar-like body having pressure equalizing and pressure relief ports, valves controlling flow through said ports, a rock-shaft supported by said body, rocker arms on said shaft, means connecting one of the rocker arms with the valve controlling the pressure relief port to rock said shaft upon opening of said valve, means actuated by the other rocker arm for closing the valve controlling flow through the equalizing port, a cover for said collar-like body and having a vacuum relief port, a vacuum valve controlling the cover relief port, and means responsive to actuation of the vacuum valve for closing said valve controlling the equalizing port independently of said valve controlling the pressure relief port.

10. A hatch including a collar-like body having separate pressure equalizing and relief ports located in spaced relation in a wall of said body, valves movably supported in said body for controlling said ports, a cover for the hatch, means removably mounting the hatch cover on said body, a trip carried by said cover and having latch engagement with one of the valves to trip said valve upon movement of the cover upon said body, and an operative connection between the other of said valves and the trip.

WALDEN W. MASON.